United States Patent [19]

Paisner et al.

[11] Patent Number: 5,202,005
[45] Date of Patent: Apr. 13, 1993

[54] GADOLINIUM PHOTOIONIZATION PROCESS

[75] Inventors: Jeffrey A. Paisner, San Ramon; Brian J. Comaskey, Stockton; Christopher A. Haynam; Jon H. Eggert, both of Pleasanton, all of Calif.

[73] Assignee: The United States of America as represented by the United States Department of Energy, Washington, D.C.

[21] Appl. No.: 744,748

[22] Filed: Aug. 14, 1991

[51] Int. Cl.⁵ .............................................. B01D 5/00
[52] U.S. Cl. .......................... 204/157.22; 204/157.21; 204/157.2
[58] Field of Search ........... 204/157.2, 157.21, 157.22; 423/2, 249

[56] References Cited

U.S. PATENT DOCUMENTS

| | | | |
|---|---|---|---|
| 3,708,392 | 1/1973 | Campbell | 376/170 |
| 4,020,350 | 4/1977 | Ducas | 250/423 P |
| 4,711,768 | 12/1987 | Peterson et al. | 423/21.5 |
| 4,793,907 | 12/1988 | Paisner et al. | 204/157.22 |
| 5,011,584 | 4/1991 | Godfried | 204/157.22 |

Primary Examiner—Brooks H. Hunt
Assistant Examiner—Ngoclan T. Mai
Attorney, Agent, or Firm—Miguel A. Valdes; Roger S. Gaither; William R. Moser

[57] ABSTRACT

A method is provided for selective photoionization of the odd-numbered atomic mass gadolinium isotopes 155 and 157. The selective photoionization is accomplished by circular or linear parallel polarized laser beam energy effecting a three-step photoionization pathway.

6 Claims, 3 Drawing Sheets

GADOLINIUM PHOTOIONIZATION PROCESS

The United States government has rights in this invention pursuant to Contract No. W7405-ENG-48 between the United States Department of Energy and the University of California for the operation of Lawrence Livermore National Laboratory.

FIELD OF THE INVENTION

The present invention relates to a method for isotope enrichment of gadolinium isotopes of odd numbered atomic mass and, in particular, to a method for isotope enrichment of gadolinium-157 by selective photoionization.

BACKGROUND OF THE INVENTION

Gadolinium enriched in its odd numbered atomic mass isotopes, $Gd^{157}$ and $Gd^{155}$, is of commercial interest, particularly for use as burnable poisons in light water nuclear power reactors. In particular, gadolinium enriched in the $Gd^{157}$ isotope is useful in fuel cycle design. It would therefore be desirable to enrich gadolinium in its 157 and 155 isotopes and in particular in its 157 isotope.

Enrichment of an atomic vapor in one or more isotopes may be achieved through separation processes which operate on very small differences between the chemical or physical properties of the isotopes, such as by selectively exciting energy states of one or more isotopes (without corresponding excitation and ionization of the other isotopes) whereby the selectively ionized isotopes may be separated from the neutral atoms by an electrical field. However, designing a scheme for selective ionization of the desired isotope in an efficient manner, including not only the atomic transitions utilized in the isolation scheme, but also the particular sources of photon energy required for overall efficiency of the process, are not readily apparent. The discovery, cataloging and design of the particular energy levels for a photoionization scheme are critical in determining the proper pathways which will result in an advantageous, efficient and commercially usable photoionization scheme.

SUMMARY OF THE INVENTION

It is an object of the present invention to provide a method of isotope enrichment of $Gd^{157}$ and $Gd^{155}$ in naturally-occurring gadolinium vapor by selective photoionization.

It is a further object of the present invention to provide a method for isotope enrichment of $Gd^{157}$ and $Gd^{155}$ in naturally occurring gadolinium vapor using copper vapor lasers or combinations of copper vapor lasers with dye lasers by using polarization selectivity.

Briefly, the present invention provides a method for isotope enrichment by isotopically selective ionization of odd numbered atomic mass isotopes of gadolinium in an atomic vapor containing a plurality of isotopes of gadolinium, comprising the steps of applying to the vapor a photon of circularly or linearly parallel polarized radiant energy sufficient to excite the odd numbered atomic mass gadolinium isotopes from the ground state, in which the odd isotopes occupying the ground state have an orbital angular momentum, J, value of 2 or 1, to a first excited state at $16923 \text{ cm}^{-1}$ or $17380 \text{ cm}^{-1}$;

further applying a photon of radiant energy, similarly polarized with the first source of radiant energy, sufficient to excite the atoms from the first excited state to a second excited state at $32660 \text{ cm}^{-1}$ or $34586 \text{ cm}^{-1}$, respectively, in which the odd isotopes occupying the second excited state have the J value of 1;

and finally applying to the vapor a photon of radiant energy, similarly polarized with the first and second sources of radiant energy, sufficient to excite the atoms from the second excited state to an autoionized state in which the odd isotopes have a J value of 0. Energy levels and transition frequencies are sometimes provided herein within 1 wave number or 0.1 wave number for convenience.

Additional objects, advantages and novel features of the present invention will be set forth in part in the following description and in part will become apparent from those skilled in the art upon examination of the following description, or may be learned by practice of the invention. The objects and advantages of the invention may be realized and obtained by means of the instrumentalities and combinations particularly pointed out in the appended claims.

BRIEF DESCRIPTION OF THE DRAWINGS

In the accompanying drawings, which are incorporated in and form a part of the specification.

Figure 1:
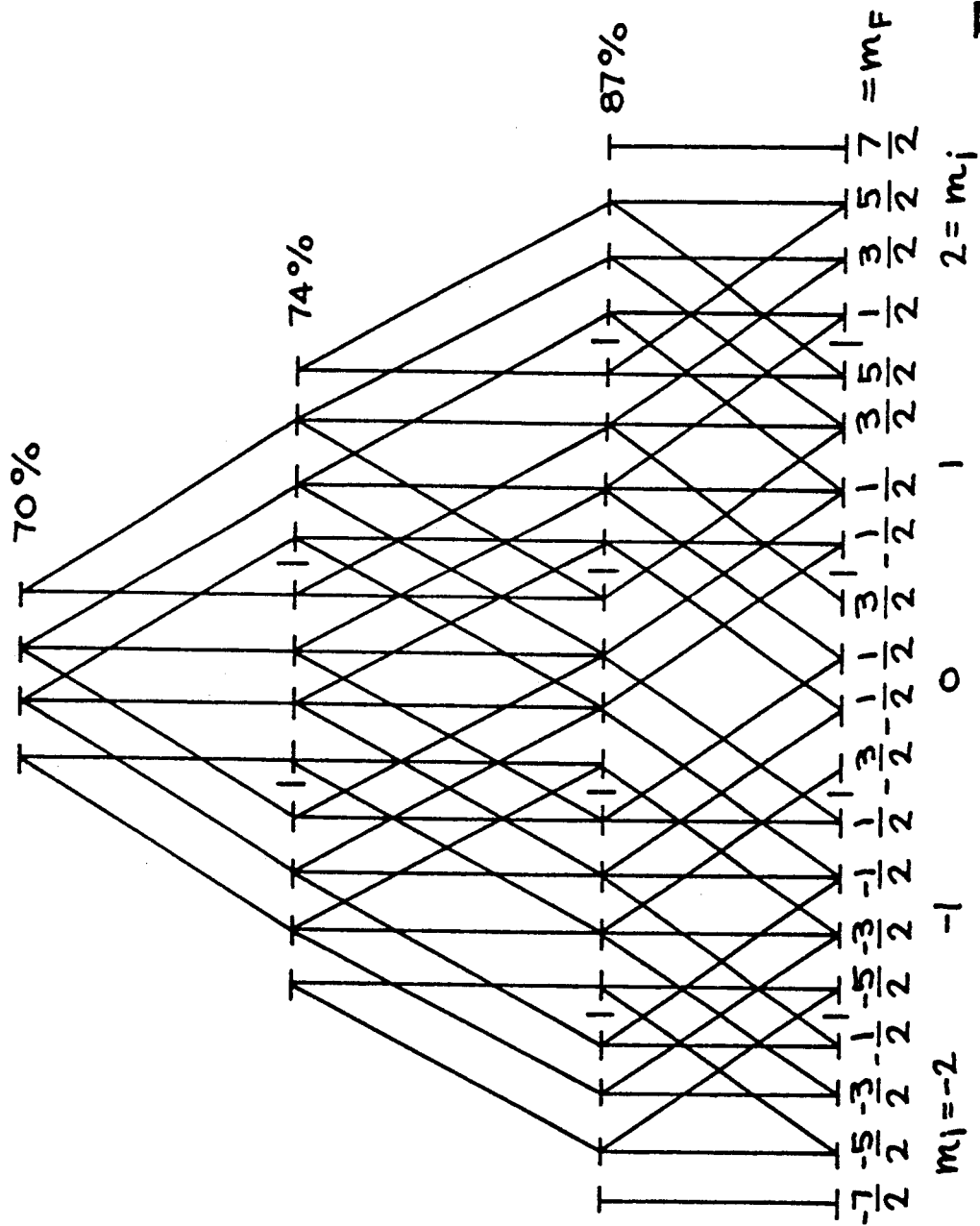
FIG. 1 is a scheme showing the various ionization pathways of $Gd^{157}$ atoms in a three-step photoionization scheme wherein the J value changes, correspondingly, from the ground state to the autoionization state, in the sequence 2 to 2 to 1 and to 0.

Together with the following detailed description, the above-described figures serve to explain the principles of the invention.

DETAILED DESCRIPTION OF THE PREFERRED EMBODIMENTS

A two-step scheme for isotope-selective laser excitation of isotopes having nonzero nuclear spin, leaving isotopes with zero nuclear spin unexcited, was proposed by L. C. Balling and J. J. Wright, *App. Phys. Lett.*, 29 (7), 411 (1976), using circularly polarized light. However, they proposed no specific physical method for separating the two different atomic species (those of zero spin and those of nonzero spin) and the excitation scheme consisted of changes of orbital angular momentum (J) in a sequence of $J=0$ to 1 to 0 wherein only circularly polarized light may be used in separation of the zero spin atoms from the nonzero spin atoms. Among the atoms proposed to be separated by the scheme, gadolinium isotopes were not disclosed.

Applicants have found three-step photoionization sequences for selectively photoionizing the nonzero spin isotopes of gadolinium and moreover have found that it can be done using either circularly polarized or parallel linearly polarized lasers. Furthermore, applicants have found that for gadolinium the sequence must occur so that the final autoionized state has an orbital angular momentum of (J) 0 and so that the immediately preceding excited state in the photoionization scheme has an orbital angular momentum of 1. The first excited state may produce a J value of either 2 or 1 for odd atomic mass isotopes of gadolinium excited from their ground state in which J=2.

Moreover, applicants have found efficient photoionization pathways following the above generalizations for gadolinium which allow for efficient production of ions of the odd numbered isotopes. By efficiency it is meant that a significantly large photoionization fraction of the desired isotope is produced, i.e., greater than about 50% of the atoms of the desired isotope are selectively photoionized.

The general apparatus utilized for the separation of the ions may be that similar to that described in connection with atomic vapor laser isotope separation techniques (AVLIS) wherein a collimated stream of atomic vapor is generated in an enclosed chamber by, for example, electron gun evaporation from a trough of liquid gadolinium metal, and the stream of vapor is passed through an area of exposure to the polarized laser beams of requisite energy and frequency. The photoions formed by the laser beams are then withdrawn from the vapor stream in an applied electric field while the neutral atoms continue in the collimated vapor stream to a separate condensation area. The ions, as they are collected on a charged surface, are neutralized and form a mixture of gadolinium atoms enriched in the particular photoionized isotope or isotopes. The general techniques and apparatus for conducting isotope separation or enrichment by AVLIS are known.

While isotope separation by selective photoionization of the even mass numbered isotopes of gadolinium is possible due to relatively broad isotope absorption frequency shifts, the two dominant isotopes of gadolinium with the nonzero nuclear spin (I) of 3/2, gadolinium 157 and gadolinium 155, have complicating hyperfine structure. For example, the isotope gadolinium 157 has hyperfine components which effectively straddle the transition frequency of gadolinium 156. Therefore the selective photoionization of gadolinium 157 poses a particularly difficult problem.

The transitions which are to be effective in the photoionization schemes according to the present invention preferably lie in the spectral region accessible by copper vapor pumped dye lasers.

In accordance with the present invention the gadolinium vapor containing a plurality of gadolinium isotopes is first exposed to a photon of linearly or circularly polarized radiant energy, preferably from a first copper vapor pumped dye laser, sufficient to excite the gadolinium 157 and 155 isotopes from the natural ground state, having angular momentum value J=2, to a first excited state which may have an angular momentum value 1 or 2. The excited states achieved by this transition are those (assuming that the energy of the ground state is zero) having energy of 16923 $cm^{-1}$ or 17380 $cm^{-1}$.

The second laser will provide a photon of linearly or circularly polarized radiant energy sufficient to excite the atoms in the first excited state to a second excited state in which the atoms have an angular momentum value (J) of 1. The second excited state are the ones occurring at 32660 $cm^{-1}$ and 34586 $cm^{-1}$, the former of which has been previously identified by others. Additionally, applicants have discovered newly identified excited states at 33037 $cm^{-1}$ and 34697 $cm^{-1}$ which may be used as the second excited state.

Finally, the third transition will be effected by a photon which causes the gadolinium 157 and 155 isotopes to be excited from the second excited state to a level wherein the angular orbital momentum (J) is 0, and which is above the energy level of the ionization for gadolinium, which occurs at 49603 $cm^{-1}$. Preferred transitions for the third and final autoionization are transitions which require 17963 $cm^{-1}$ or 16038 $cm^{-1}$ of energy.

Two photoionization schemes for gadolinium 155 and 157 are shown in Tables 1 and 2 below:

TABLE 1

Spectroscopic parameters for gadolinium process

| 156Gd energy level (cm$^{-1}$) | J value | Wavelength $\lambda$ air (Å) | Wavenumber $\nu$ (cm$^{-1}$) | Lifetime $\tau$ (ns) | Oscillator strength, $f_{ul}$ (10$^{-3}$) | Gd hyperfine shift constants (MHz) 157 | Gd hyperfine shift constants (MHz) 155 | Transition isotope shifts relative to 156 isotope (GHz) 160 | Transition isotope shifts relative to 156 isotope (GHz) 158 | Transition isotope shifts relative to 156 isotope (GHz) 157 | Transition isotope shifts relative to 156 isotope (GHz) 155 |
|---|---|---|---|---|---|---|---|---|---|---|---|
| 0 | 2 | 5907.35 | 16923.38 | | 0.7 ± 0.1 RAXS HRXS $\beta\tau$ | A = 47.959 ± 0.008 B = 191.16 ± 0.07 | A = 36.573 ± 0.001 B = 179.40 ± 0.07 | −0.060 ±0.01 | −0.043 ±0.01 | −0.016 ±0.01 | +0.029 ±0.01 |
| | | 6352.51 | 15737.46 | 700 ±200 | 0.063 ± 0.01 RAXS | A = 74.7 ± 0.5 B = 173 ± 2 | A = 56.6 ± 0.5 B = 164 ± 3 | −3.700 ±0.02 | −1.189 ±0.02 | −0.154 ±0.02 | +1.372 ±0.02 |
| | | 5565.20 | 17963.84 | 1000 ±100 | 2.1 ± 0.3 SAXS | A = 149 ± 12 B = 116 ± 22 | A = 127 ± 14 B = 131 ± 25 | All less than homogeneous line width of 4.5 GHz | | | |
| | | | | 0.035 ±0.004 4.5 GHz LW | | A = 0 B = 0 | A = 0 B = 0 | | | | |

Notes:
RAXS = Rabi flop absolute cross section
SAXS = Saturation absolute cross section
HRXS = Hollow cathode relative cross section
$\beta\tau$ = Lifetime, branching ratio cross section
LW = Line width

TABLE 2

Spectroscopic parameters for gadolinium process

| 156Gd energy level (cm⁻¹) | J value | Wavelength λ air (Å) | Wavenumber ν (cm⁻¹) | Lifetime τ (ns) | Oscillator strength, $f_{ul}$ (10⁻³) | Gd hyperfine shift constants (MHz) | | Transition isotope shifts relative to 156 isotope (GHz) | | |
|---|---|---|---|---|---|---|---|---|---|---|
| | | | | | | 157 | 155 | 160 | 158 | 157 | 155 |
| 0 | 2 | | | | | | | | | | |
| 17380 | 2 | 5751.9 | 17380.8 | | 3.4 ± 0.5 HRXS βτ | A = 47.95 ± 0.008 B = 191.16 ± 0.07 | A = 36.575 ± 0.001 B = 179.40 ± 0.07 | −2.233 ±0.01 | −1.119 ±0.01 | −0.021 ±0.01 | +0.763 ±0.01 |
| | 1 | 5810.37 | 17205.8 | 1000 ±100 | 0.7 ± 0.02 RAXS | A = 95.1 ± 0.4 B = 347 ± 2 | A = 72.5 ± 0.5 B = 323 ± 3 | +2.468 ±0.02 | −1.185 ±0.02 | −0.144 ±0.02 | +0.838 ±0.02 |
| 34586 | 1 | 6233.47 | 16038.0 | 820 ±150 | 3.9 ± 1 SAXS | A = 708 ± 3 B = 57 ± 6 | A = 539 ± 4 B = 63 ± 6 | All less than homogeneous line width of 4.5 GHz | | | |
| 50624.7 | 0 | | | 0.035 ±0.004 4.5 GHz LW | 10 ± 2 | A = 0 B = 0 | A = 0 B = 0 | | | | |

Notes:
RAXS = Rabi flop absolute cross section
SAXS = Saturation absolute cross section
HRXS = Hollow cathode relative cross section
βτ = Lifetime, branching ratio cross section
LW = Line width Referring to FIG. 1, there are shown the allowed transitions among all the possible $Gd^{157}$ atoms due to hyperfine splitting. The possibilities for nuclear spin among the atoms are given at the bottom the chart. The vertical and diagonal lines show the respective allowed transitions to the first excited state (from the ground state J=2 to the first excited state wherein J=2), and then to the succeeding second excited state (J=2 to J=1) and finally to the autoionization state where J=0. Statistically, among the $Gd^{157}$ atoms of all possible nuclear spins, 87% of the atoms have allowed transitions to the first excited state, 74% (relative to all the atoms in the ground state) have allowed transitions to the second excited state and 70% of all atoms (relative to the ground state) have allowed transitions to the autoionization state. Thus the three-stage transition defined by angular momentum changes of 2 to 2 to 1 to 0 make it possible to photoionize 70% of the $Gd^{157}$ atoms.

Figure 2:
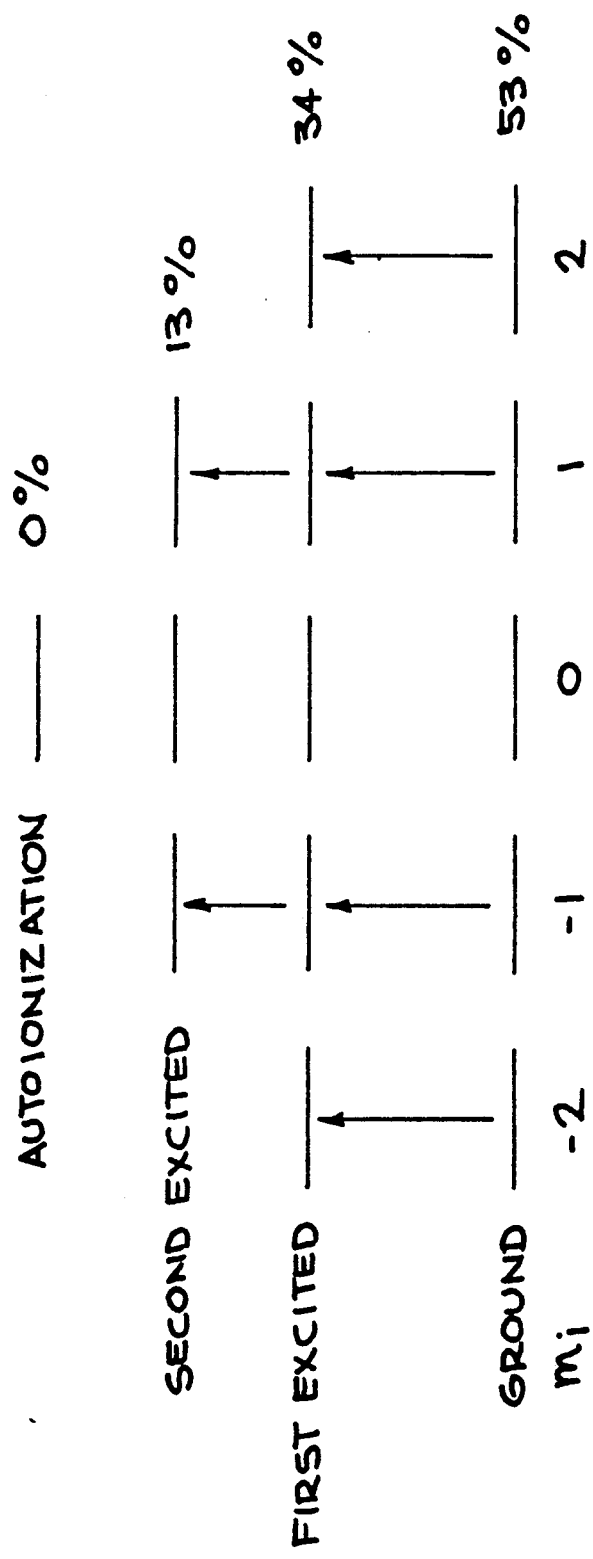
FIG. 2 is a diagram showing the average population distribution of flow of even atomic mass isotopes of gadolinium in a photoionization scheme for the odd isotopes wherein the J values change, ground state to the autoionization state, respectively, in the sequence 2 to 2 to 1 to 0.

Referring to FIG. 2, there is shown an average population distribution of the even numbered isotopes from gadolinium given the same transition series 2 to 2 to 1 to 0 using parallel polarization. As can be seen from FIG. 2, the even numbered atoms have possible nuclear spins $m_j$ and 53% of the atoms at any point in time will occupy the ground state while 34% of the atoms have allowed transitions to the first excited state, but only 13% of the even numbered atoms (relative to the ground state) have allowed transitions to the second excited state. However, none of the even numbered isotopes have allowed transitions to the autoionization state.

The following example is provided to illustrate the invention, but is not intended to limit the invention in any way.

EXAMPLE

Figure 3A:
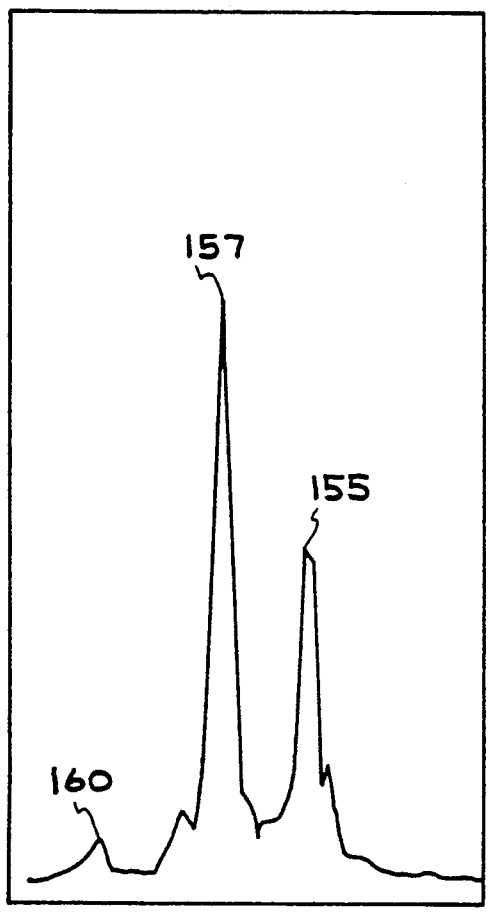
FIG. 3 demonstrates isotope selectivity as a result of polarization selectivity on gadolinium using parallel linear lasers (FIG. 3A) as opposed to utilizing a photoionization scheme where the third photoionization laser is not polarized parallel to the other two photoionization lasers (FIG. 3B).
Figure 3B:
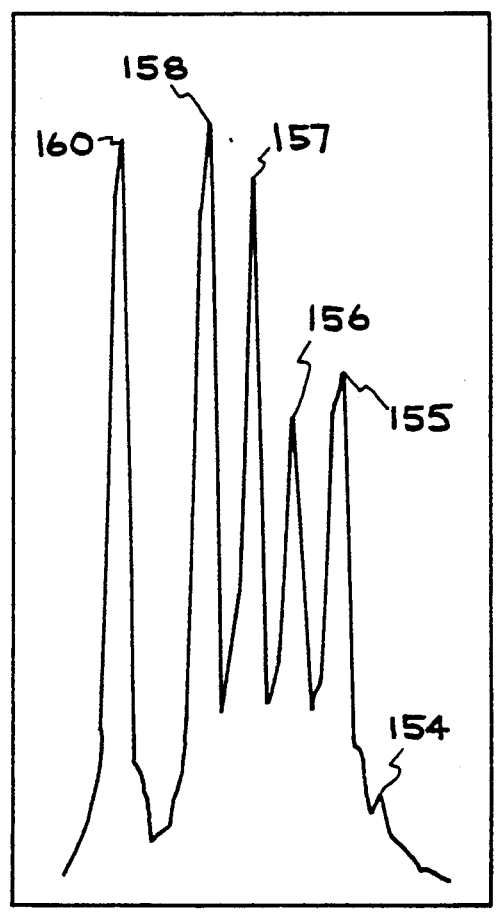

A resistively heated crucible containing gadolinium was heated to produce an atomic gadolinium vapor. The vapor was collimated and illuminated with laser light in a photo zone free of a magnetic field, then passed through a quadrupole mass spectrometer. In the photo zone, three broad-band lasers (having band width of 5-10 GHz) were tuned to frequencies to allow excitation from ground level (J=2) of gadolinium to a J=0 autoionization level. The mass spectrographs are shown in FIG. 3 in two instances where, on the left (FIG. 3A), the third-step laser was linearly polarized parallel to the first two lasers. The spectrograph on the right (FIG. 3B) shows the results when the third-step laser was not linearly polarized parallel to the first two lasers. The photoplasma was accelerated into the mass spectrometer and the relative abundance of each of the isotopes comprising the photoplasma was assayed. When the lasers are all linearly parallel polarized, the polarization selectivity is shown in FIG. 3A wherein the photoplasma is enriched in $Gd^{157}$ and $Gd^{155}$. It appears that small residual magnetic fields from the resistively heated crucible or small deviations from linear polarization allow a small fraction of the even numbered atomic mass isotopes to also ionize to a slight degree. In the spectrogram on the right (FIG. 3B), where linear parallel polarization is not utilized, it can be seen that the odd and even numbered atomic mass isotopes are ionized. This test shows that polarization selectivity alone allows the odd numbered isotopes to be separated from the even gadolinium. Isotope shifts can allow for the two odd-numbered isotopes to be then subsequently separated from one another.

The foregoing description of the preferred embodiments of the invention is provided for purposes of illustration and description. It is not intended to be exhaustive or to limit the invention to the precise forms disclosed and obviously many modifications and variations are possible in light of the above teachings. The embodiments were chosen and described in order to best explain the principles of the invention and their practical application to thereby enable others skilled in the art to best utilize the invention in the various embodiments and the various modifications as are suited to the particular use contemplated. It is intended that the scope of the invention be defined by the claims appended hereto.

What is claimed is:

1. A method for isotopically selective ionization of an isotope of gadolinium having odd-numbered atomic mass in an atomic vapor containing a plurality of isotopes of gadolinium comprising the steps of applying to said vapor a photon of linearly or circularly polarized radiant energy sufficient to excite said odd-numbered atomic mass isotope of gadolinium from the ground state having an orbital angular momentum, J, value of 2, to a first excited state at an energy level of 16923 cm$^{-1}$, relative to the zero energy of said ground state;

applying a photon of similarly polarized radiant energy sufficient to excite atoms in said first excited state to a second metastable excited state at an energy level of 32660 cm$^{-1}$, relative to the zero energy of said ground state having an orbital angular momentum value, J, of 1; and applying a photon of similarly polarized radiant energy sufficient to excite the atoms in said second excited state to an autoionized state having an orbital angular momentum value, J, of 0.

2. A method according to claim 1 wherein said autoionized state is at an energy level of 50624.7 cm$^{-1}$ relative to said ground state.

3. A method according to claim 2 wherein the transition to said first excited state is effected by a copper vapor pumped dye laser tuned to a frequency of 16923 cm$^{-1}$, said transition from said first excited state to said second excited state is effected by a copper vapor pumped dye laser tuned to a frequency of 15737 cm$^{-1}$, and the transition from said second excited state to said autoionization state is effected by a copper vapor pumped dye laser tuned to a frequency of 17963.8 cm$^{-1}$.

4. A method for isotopically selective ionization of a isotope of gadolinium having odd-numbered atomic mass in an atomic vapor containing a plurality of isotopes of gadolinium comprising the steps of applying to said vapor a photon of linearly or circularly polarized radiant energy sufficient to excite said odd-numbered atomic mass isotope of gadolinium from the ground state having an orbital angular momentum, J, value of 2, to a first excited state at an energy level of 17380 cm$^{-1}$, relative to the zero energy of said ground state;

applying a photon of similarly polarized radiant energy sufficient to excite atoms in said first excited state to a second metastable excited state at an energy level of 34586 cm$^{-1}$, relative to the zero energy of said ground state, having an orbital angular momentum value, J, of 1; and applying a photon of similarly polarized radiant energy sufficient to excite the atoms in said second excited state to an autoionized state having an orbital angular momentum value, J, of 0.

5. A method according to claim 4 wherein said autoionization state is at an energy level of $50624.7$ cm$^{-1}$ relative to said ground state.

6. A method according to claim 5 wherein the transition from the ground state to said first excited state is effected by a copper vapor pumped dye laser tuned to a frequency of $17380$ cm$^{-1}$, the transition from said first excited state to said second excited state is effected by a copper vapor pumped dye laser tuned to the frequency of $17205$ cm$^{-1}$, and the transition from said second excited state to said autoionization state is effected by a copper vapor pumped dye laser tuned to a frequency of $16038.0$ cm$^{-1}$.

* * * * *